United States Patent [19]
Vlahos

[11] 3,728,495
[45] Apr. 17, 1973

[54] METHOD AND APPARATUS FOR CONTROLLING DISTORTION IN PHOTOGRAPHIC SOUND RECORDS

[75] Inventor: Petro Vlahos, Tarzana, Calif.

[73] Assignee: The Association of Motion Picture and Television Producers, Inc., Hollywood, Calif.

[22] Filed: Sept. 2, 1971

[21] Appl. No.: 177,323

[52] U.S. Cl. .......... 179/100.3 P
[51] Int. Cl. .......... G11b 27/36
[58] Field of Search .......... 179/100.3 P, 100.3 D, 179/100.3 A, 100.3 GN, 100.2 B, 100.2 S, 100.2 K, 100.4 D

[56] References Cited

UNITED STATES PATENTS

| | | | |
|---|---|---|---|
| 1,989,965 | 2/1935 | Beverage | 179/100.3 P |
| 2,337,958 | 12/1943 | Albin | 179/100.3 D |
| 3,182,135 | 5/1965 | Siezen | 179/100.2 B |
| 3,406,264 | 10/1968 | Phillipson et al. | 179/100.4 D |
| 2,774,056 | 12/1956 | Stafford et al. | 179/100.2 B |
| 2,510,607 | 6/1950 | Sharp | 179/100.3 P |
| 2,832,840 | 4/1958 | Morin | 179/100.2 B |

*Primary Examiner*—Raymond F. Cardillo, Jr.
*Attorney*—Charlton M. Lewis

[57] ABSTRACT

Correct exposure of photographic sound records for motion pictures and the like is insured by processing as part of each record a conventional test signal, scanning the completed test signal record, and producing a cathode ray tube display that shows both the magnitude and the direction of the change in printing exposure that is required to correct any distortion. The test signal typically comprises a high frequency tone that is amplitude modulated at a low frequency. The test record is preferably scanned by oscillating it back and forth, typically by hand, approximating one-tenth normal speed. An effectively continuous signal output is thereby obtainable from only 1 or 2 inches of record. High and low frequency components, corresponding to the test tone and the modulation frequency, are isolated from the scanner output and are applied after suitable respective amplification to the $x$ and $y$ deflection circuits of the cathode ray tube. The tube is preferably blanked under control of the high frequency component to eliminate spurious signals during turnaround of the oscillating film.

9 Claims, 8 Drawing Figures

INVENTOR
PETRO VLAHOS,
By Charlton M. Lewis

METHOD AND APPARATUS FOR CONTROLLING DISTORTION IN PHOTOGRAPHIC SOUND RECORDS

This invention provides improved methods and apparatus for detecting and measuring the type of distortion in photographic sound tracks that is known as cross-modulation or intermodulation and that is due primarily to incorrect density of the photographic print.

A particular advantage of the present invention is that the test results give a direct indication of the direction in which the print density needs to be changed, as well as the approximate magnitude of the change required to minimize or eliminate the cross-modulation.

The invention is especially useful in connection with variable area sound tracks of the type commonly employed on motion picture film, particularly on release prints.

When a variable area motion picture sound track carries a recorded tone having a relatively high audio frequency, such as 9,000 hertz, for example, for 35mm film or 5,000 hertz for 16mm film, the width of the transparent area of the track varies correspondingly rapidly, producing the visual appearance of the teeth of a comb. If those width variations are strictly sinusoidal in shape, the average width of the track is independent of the amplitude of the tone. The amplitude of the 9,000 hertz tone can then be varied periodically, for example at 400 hertz, and the reproduced sound will contain only the recorded 9,000 hertz tone. However, excessive density during printing of the sound track, or insufficient density to balance the negative from which the print is made, produces width variations that are not strictly sinusoidal, the "teeth" of the transparent area being too narrow or too wide. A 400 hertz amplitude variation of the high frequency tone then gives the same effect as if a 400 hertz sound had been recorded in superposition upon the high frequency signal.

Such distortion is usually controlled in the motion picture industry by carrying out extensive tests from which the proper sound track density for release prints can be determined. A special test signal is recorded and printed under a wide variety of conditions, including the full range of negative densities that may be encountered. The test prints are run on a sound projector and the amount of cross-modulation is directly measured and plotted. The resulting family of curves permits selection of a suitable exposure for printing any given negative. However, each test series may consume 500 feet of color film. Moreover, such tests must be repeated for each new emulsion batch and after any significant change of condition, such as adjustment of the pressure shoes on the printing machine. Although such conventional control procedure normally leads to satisfactory release prints, it does not provide any direct test of the prints themselves.

In accordance with the present invention, a test signal is initially recorded directly on the photographic negative in association with the sound record. When the sound record is printed, the test signal section is printed along with it and provides a direct verification of the print quality.

The invention further provides simple and economical equipment by which the magnitude and nature of the distortion, if any, can be determined rapidly and reliably from only a few inches of such a test signal record, in contrast to the many feet of film required for conventional distortion measurements. The short length of test record required can be produced conveniently by means of a switching device which automatically applies the test signal as input to the recording system for a tenth of a second, say, just before the start and again immediately following the end of each sound record. Alternatively, if the sound is originally recorded on magnetic tape and later transferred to a photographic sound negative, as in conventional practice, the test signal may be provided in the form of a roll of prerecorded magnetic tape. A few inches of that test record may then be spliced into the master tape just ahead of the program material and transferred with it to the photographic sound negative.

The test equipment provided by the invention shows not only the amount of distortion present in the sound record, but also indicates directly whether the print density is too high or too low. The test display can readily be calibrated directly in terms of the required change in printer lamp current, for example. Unless the error is abnormally large, a single test measurement then provides full correction. Moreover, since the test signal has received identical processing throughout, the test information applies directly and without any extrapolation or other uncertainty to the actual sound recording.

The optical system of the test apparatus may be closely similar to that of a conventional sound reproducer, including a lamp for illuminating the sound track, a lens system for imaging the track on a photocell, and a slit for causing the photocell to scan the track as the film moves through the light beam. The present invention, however, replaces the film supporting roller and flywheel of the conventional sound reproducer by a film gate structure and means for moving the film through the gate at a speed that is typically only about one-tenth the standard motion picture film speed. At that relatively low speed, the film can conveniently be shifted longitudinally back and forth over a short distance, such as 1 or 2 inches, providing nearly continuous reproduction of the sound track, first in one direction and then in the other. Such reproduction can be continued for any desired time period, yet requires only an extremely short length of film.

In preferred form of the invention, the film is oscillated back and forth manually, as by direct rotation of a knob connected to a sprocket or rubber puck engaging the film. The wrist can be turned easily back and forth through approximately one-fourth revolution at a rate of from about one to about five cycles per second. Alternatively, an electrical or mechanical drive of any suitable type may be provided for producing motion of the described type.

A preferred form of test display utilizes a cathode ray oscilloscope. The photocell output from the film scanner is supplied in parallel to two filters, one of which passes only a high frequency band that includes the frequency corresponding to the recorded test frequency. The other filter passes only a low frequency band that includes the frequency corresponding to the modulation frequency. The filter cut-off frequencies are designed with due regard for the abnormally slow reproducing speed of the film, already described. At the same time, the two pass bands are sufficiently broad to accommodate a wide range of film speeds, so that the actual speed of film drive is not critical.

After suitable amplification of the two signal components, with different gains to compensate for their widely different intensities, they are applied respectively to the horizontal and vertical deflection plates of the oscilloscope, producing a lissajou figure on the screen. That figure typically resembles an equilateral triangle with horizontal base corresponding in length to the maximum amplitude of the high frequency tone. The height of the triangle corresponds to the amplitude of the low frequency component, indicating directly the magnitude of the distortion. The apex of the triangle points either up or down, depending upon the phase of the cross-modulation, indicating directly whether the distortion is due to overprinting or underprinting of the sound record.

A particular advantage of that general type of display is that it does not require accurate control of the film speed. If the test record comprises a 9,000 hertz tone that is amplitude modulated at 400 hertz, for example, and if the high pass filter passes frequencies above 300 hertz and the low pass filter passes frequencies below 100 hertz, fully effective test results are obtainable at least within the range of film speeds between one-fourth and one-thirtieth normal speed. If the film is oscillated sinusoidally, for example, with a maximum speed in the range between one-fourth and one-fifteenth normal, a useful signal is typically generated during at least half of each cycle. Selection of a phosphor with suitable persistence will maintain the display visible during the short times required for slowing down and reversing direction.

A further aspect of the invention prevents obscuring the true form of the test display by spurious signals that might be generated during stopping and reversal of the film movement. For that purpose the cathode ray beam is blanked under control of the high frequency component of the photocell output, the beam being enabled only when that component exceeds a definite threshold intensity. The filter cutoff frequency for such blanking control is preferably slightly higher than that which defines the high frequency component for the display. The automatic blanking action also protects the tube screen from burning when the film is stationary or removed from the gate.

The same flexibility of the present method that accommodates a wide range of film speeds during test turns also accommodates test signals based on a range of different frequencies. Thus, it is essentially immaterial whether the test frequency is 9,000 hertz, as assumed above for illustration, 8,000 hertz, as preferred by some laboratories, or 5,000 hertz, as conventionally used for 16mm film. Also, the test procedure requires no change to utilize the alternative type of test signal, comprising two mutually spaced high frequency components such as 9,000 and 8,600 hertz, for example, which are simply mixed. The difference frequency is present in the output from such a test record only if distortion is present.

The system is readily adaptable to 35mm, 16mm or 8mm film by suitable modification of the film gate, film advancing mechanism and optical system. Since 16mm film normally runs at about half the speed of 35mm film, test tones of 5,000 hertz on 16mm film and of 9,000 hertz on 35mm film appear as combs with roughly equal tooth spacing. The same film drive mechanism is therefore suitable for scanning both, and the same high and low pass filters can ordinarily be used for both. A similar scaling relation applies for 8mm film carrying a test record of 2,500 to 3,000 hertz. Hence typically only the gate and slit length need to be changed to adapt a test system to all three film sizes. However, a variety of filters with different cutoff frequencies can readily be provided and interchanged by conventional switching.

A full understanding of the invention, and of its further objects and advantages, will be had from the following description of a preferred manner of carrying it out. The particulars of that description, and of the accompanying drawings which form a part of it, are intended only as illustration, and not as a limitation upon the scope of the invention.

Figures 1, 2, 3, 5, 6, 7:
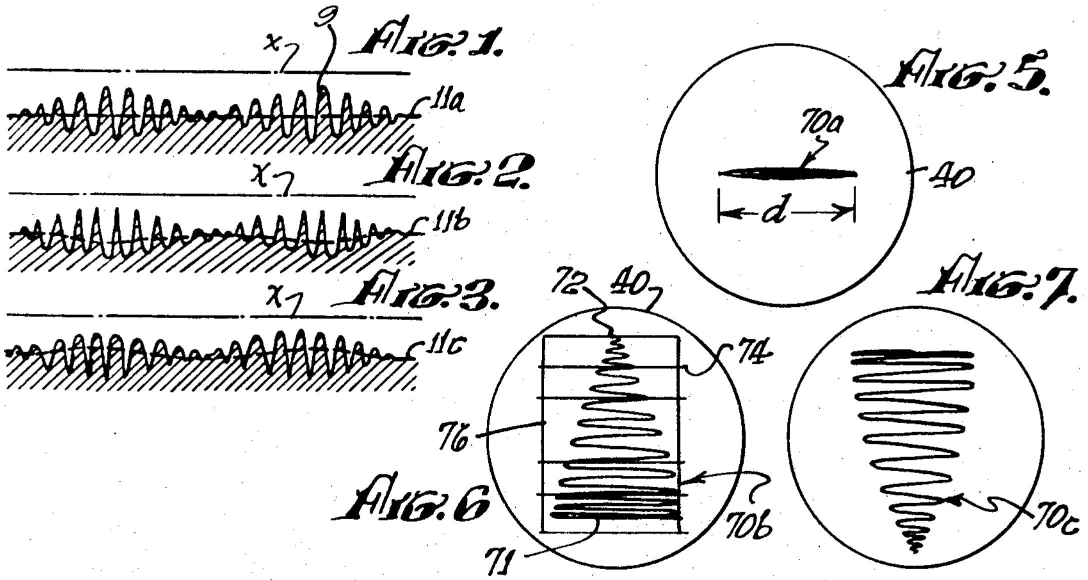
FIGS. 1, 2 and 3 are schematic representations of a photographically recorded test signal, printed with correct density, too low density, and too high density, respectively.
FIGS. 5, 6 and 7 are schematic drawings representing test displays typically corresponding to the test sound records of FIGS. 1, 2 and 3, respectively.

The nature of the distortion with which the invention is particularly concerned can best be understood by reference to FIGS. 1, 2 and 3, which represent corresponding portions of typical test sound track prints with correct exposure, with under-exposure, and with over-exposure, respectively. Only one side of the track is shown, the other side being typically symmetrical with respect to the central axis *x*. The high frequency variations in the sound track width give the appearance of dense teeth 9 of a comb extending from each side into the transparent central area of the track. Those teeth vary gradually in length at the relatively low frequency of the amplitude modulation. In each track shown, the dotted line 11 represents schematically the average boundary of the transparent area of the track, averaging out the high frequency variations. With correct exposure, as in FIG. 1, the average track boundary 11*a* is the same for zero amplitude and for maximum amplitude of the high frequency tone.

For the under-exposed print of FIG. 2 the dense comb teeth are abnormally narrow, causing the average boundary 11*b* to deflect outward as the tone amplitude increases. The average track width therefore varies at the modulation frequency, and when the track is reproduced a sound component at the modulation frequency will be produced. That sound component is in phase agreement with the envelope of the modulation of the high frequency tone.

When the sound record print is over-exposed, as in FIG. 3, a distortion sound component at the modulation frequency is also produced, but that sound is then 180° out of phase with the modulation envelope of the high frequency tone, as shown by the boundary 11c. Accordingly, it is possible to distinguish the sign of the density error in a particular print by detecting not only the presence of a sound component at the modulation frequency but also the phase relation between that sound component and the modulation.

Figure 4:
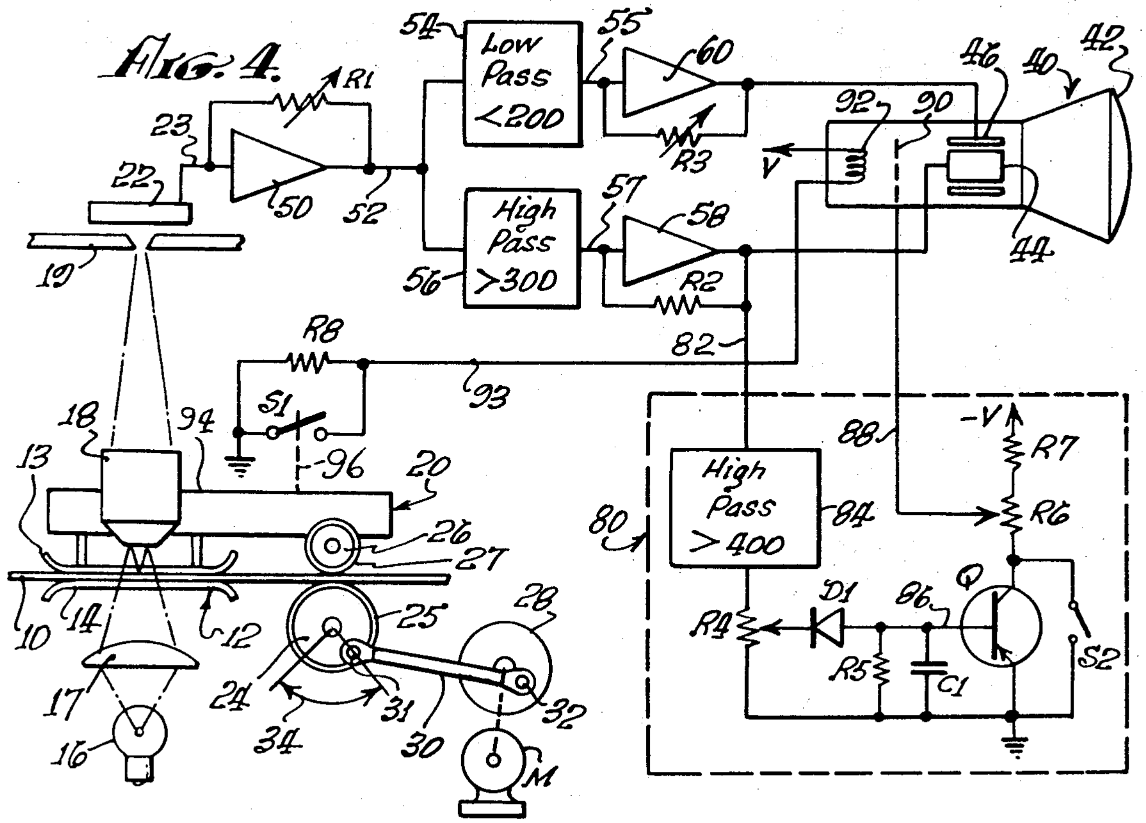
FIG. 4 is a schematic drawing representing a test system in accordance with the invention.

An illustrative test system in accordance with the invention is shown schematically in FIG. 4. The photographic film, carrying a typical test record, is indicated at 10, positioned by a film gate 12 in which it can be longitudinally moved under control of the drive mechanism 20. Gate 12 is represented illustratively as a set of upper and lower chrome runners 13 and 14 which slidingly bear on the film at the sprocket hole region, so that they accurately define the position of the sound track area without danger of scratching the sound track or picture. The sound track is illuminated by the lamp 16 and condensing lens 17. An image of the sound track is formed by the objective lens 18 at the defining slit 19, which has a length perpendicular to the plane of FIG. 4 corresponding to the maximum width of the sound track. The slit width is typically less than half of the peak to peak spacing, measured on the sound track image, of the sound track variations that correspond to the high frequency tone employed on the test track. Radiation passing slit 19 is detected by the photosensor indicated schematically at 22, producing on the line 23 an electrical signal representing the radiation intensity.

Film drive mechanism 20 typically comprises the drive roller 24 and the idler roller 26, which are journaled on opposite sides of the film and frictionally engage the film, preferably with the rubber tire structures 25 and 27. Roller 24 is arranged to be rotated with an oscillatory motion, typically through an angle of 90° to 180°, to produce a corresponding linear oscillatory movement of the film. As illustratively shown, roller 24 is driven by the electric motor M, which is coupled through a suitable gear reduction to the drive wheel 28. The connecting rod 30 is pivoted at its opposite ends on roller 24 at the pivot 31 and wheel 28 at the pivot 32. The radius of pivot 32 from the axis of wheel 28 is typically only about half the radius of pivot 31 from the axis of roller 24. Continuing rotation of wheel 28 then causes roller 24 to oscillate back and forth through a definite angle such as that indicated at 34. The substantially sinusoidal roller oscillation produced by the relatively simple mechanism illustrated may be modified as desired by incorporating known coupling devices, as to give the oscillation more nearly sawtooth form with a relatively long period of essentially uniform movement and a relatively rapid reversal of direction. Also, the motor M and crank mechanism shown may be replaced by a simple manual knob mounted directly on the shaft of roller 24 or geared to that shaft in any suitable manner. Manual oscillation of that knob then produces film movement of a similar nature to that illustrated.

In the system of FIG. 4, the test results are exhibited on the screen 42 of the cathode ray tube 40. The signal output from photosensor 22 on line 23 is first amplified by the amplifier 50, the gain of which is variable, as by adjustment of the negative feedback resistor R1. That adjustment is useful for compensating aging of the lamp 16 and other similar effects. Also, a stepwise adjustment may be provided to insert the required increase in gain when 16mm or 8mm film is measured, to compensate the reduced total modulation due to the narrower sound track on those smaller films. The output from amplifier 50 on the line 52 is supplied in parallel to both the low pass filter network 54 and the high pass filter network 56, which may be of conventional form. The high pass output on the line 57 includes the frequency component of the photosensor output corresponding to the recorded tone and excludes that corresponding to the modulation frequency. The low pass output on the line 55 includes the frequency component of the photosensor output corresponding to the modulation frequency and excludes that corresponding to the tone frequency, thus representing the distortion present in the printed sound track record. The relatively high frequency tone component is amplified by the operational amplifier 58 with the feedback resistor R2, and is applied to one deflection circuit of cathode ray tube 40, typically shown as the horizontal deflection plates 44. The relatively low frequency distortion component is amplified by the operational amplifier 60 with the feedback resistor R3, and is applied to the orthogonal deflection circuit, shown as the vertical deflection plates 46. The gain of amplifier 60 is preferably adjustable, as by variation of R3, for establishing the system calibration, to be described, and may be provided also with several discrete levels to facilitate reading widely differing distortions. However, the general level of that adjustable gain exceeds the gain of amplifier 58 by a factor of the order of 30dB, thereby bringing the distortion signal up to an amplitude comparable with the tone signal.

The resulting pattern on CRT screen 42 has a general appearance as illustrated schematically in FIGS. 5, 6 and 7 for three selected conditions which correspond approximately to the sound tracks of FIGS. 1, 2 and 3. If there is zero distortion the vertical beam deflection is zero, and the pattern is simply a horizontal line as shown at 70a in FIG. 5. The length *d* of the line corresponds to the maximum amplitude of the recorded tone. Since the tone is modulated, typically reaching zero amplitude 400 times per second, the pattern intensity is greatest at the center and decreases symmetrically toward its ends.

If distortion is present, the beam is deflected vertically in definite phase relation to the modulation of the horizontal amplitude. The output of low frequency amplifier 60 can be connected to the vertical deflection plates 44 in either of two polarities. Assuming the appropriate connections, if the distortion signal is in phase with the modulation envelope of the high frequency tone, as shown typically in FIG. 2, the CRT beam is deflected upward when the amplitude of the high frequency tone is least, and downward when it is greatest, producing the triangular pattern represented at 70b in FIG. 6 with the apex 72 of the triangle pointing up. Since that condition corresponds to under-exposure of the sound record print, the upward pointing display can be interpreted as meaning that the density should be increased. On the other hand, an over-exposed print will produce a distortion signal in opposite phase to the modulation envelope, leading to a downwardly pointing triangle, as shown at 70c in FIG. 7. Needless to say, opposite connections to the vertical deflection plates interchange the phase interpretations of FIGS. 6 and 7.

As an example of the many other forms of display that may be employed, the tone signal from high pass filter 56 may be demodulated (rectified) before application to the horizontal deflection plates of the CRT. The display then comprises a single inclined line which corresponds generally to a side edge of the triangle shown in FIG. 6 or 7. The vertical excursion of such a line is greater the more the distortion, and the line is inclined upward or downward according to the sign of the error in the sound track print density.

CRT screen 42 may carry a scale representing the magnitude of the distortion, as indicated schematically by the vertically spaced lines 74 in FIG. 6. Such a scale may be calibrated in terms of the number of decibels the distortion signal is below the tone signal, or may read directly in terms of the change in printer lamp current that is required to eliminate the measured distortion. A horizontal scale may also be provided, as at 76, showing the normal length *d* of the base 71 of the pattern triangle.

An illustrative tube blanking circuit is represented at 80. The high frequency signal component is taken from the output of amplifier 58 on the line 82 and is preferably further shaped by the high pass filter network 84 to raise the cutoff frequency slightly above that of filter 56. The filter output is adjusted in amplitude by the potentiometer R4, connected as a variable attenuator. The resulting signal is rectified by the diode D1 and smoothed by the resistance R5 and capacitance C1 to produce a negative-going voltage on the line 86. That voltage is applied to the base of the transistor Q, which has its emitter grounded and its collector connected via the series resistors R6 and R7 to a source of negative voltage −V. A sliding contact on R6 is connected via the line 88 to the grid 90 of CRT 40, which controls the intensity of the cathode ray beam. With Q cut off, as when the voltage on line 86 is essentially zero, grid 90 receives the full voltage of source −V, effectively blanking the CRT beam. With the voltage on line 86 sufficiently negative to render Q conductive, grid 90 receives only a fraction of −V, which renders the CRT beam visible with a brightness adjustable at R6.

With that illustrative circuit, if film 10 is stationary or is removed from the film gate, or if the film speed in either direction is so low that the recorded high frequency tone is reproduced as a frequency lower than the cutoff of filter 84, the voltage on line 86 is essentially zero, blanking CRT 40. When the film speed increases above a definite threshold, conduction in Q enables the CRT, causing the pattern 70 to appear with normal brightness on the tube screen. The components and adjustments are preferably such that the described speed threshold corresponds to a reproduced tone frequency just sufficiently high so that amplitude of the tone component on line 57 is not significantly limited by high pass filter 56.

The filament 92 of CRT 40 is preferably reduced to a standby temperature whenever the film gate 12 is opened. As indicated schematically, filament 92 has one terminal connected to a normal voltage source V and the other connected to ground via the line 93 and the parallel connected switch S and resistor R8. Upper gate runner 13 and idler roller 26 are mounted on the support 94 which can be shifted upwardly from the normal position of FIG. 1 to open the gate and release film 10. Switch S is coupled to support 94, as indicated schematically by the broken line 96. With the gate closed, R8 is shorted, applying normal operating voltage to the CRT filament. With the gate open, R8 is inserted in the circuit, reducing the filament to an economical standby temperature.

The present invention can utilize successfully the same type of test signal conventionally employed in the industry at the present time, which may be generated, for example, by commercially available equipment designed for that purpose. Such equipment comprises in substance an oscillator and a modulator, as illustrated schematically at 100 and 102, respectively, in FIG. 8. The resulting test signal on the line 105 can be recorded on magnetic tape by a conventional tape recorder of suitable quality. A roll of such tape may then be utilized as a signal source whenever a previously recorded sound sequence is to be transferred from magnetic tape to photographic film. For that purpose, a short section of the signal tape, typically an inch or two, is spliced into the master tape just ahead of the program material and appears in the resulting photographic sound negative. Since the negative test record has received the same exposure and processing as the program material, it is well adapted for controlling the printing of that negative, as in the production of release positives.

Figure 8:
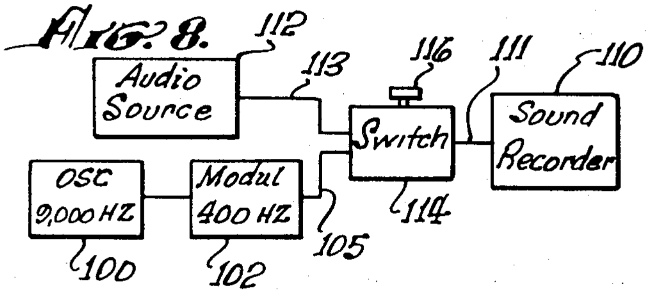
FIG. 8 is a schematic drawing representing a switching system for recording a test signal adjacent a conventional sound record.

If it is preferred to record a test signal directly on film, the switching system shown schematically in FIG. 8 may be employed. A conventional photographic sound recorder is represented at 110 with audio signal input via the line 111. The numeral 112 represents the source of the regular audio material to be recorded. That source may be a conventional microphone and amplifying system or a magnetic tape reproducer for producing on the line 113 an electrical signal from a previously prepared magnetic tape recording. The switch 114 is interposed between recorder 110 and the two audio sources 100 and 112. Switch 114 is typically a solid state electronic switch which acts in response to the control member 116 to supply the test signal from line 105 to recorder 110 for a set time period, typically one-tenth second, and then to connect instead the line 113 carrying the regular audio program. The sound record negative produced by photographic recorder 110 then includes a short test section which is available for monitoring or controlling the printing of a positive record in the manner already described.

For calibrating the system it is useful to employ a standard test film which contains, for example, a 9,000 hertz tone of definite amplitude level and a superimposed 400 hertz tone whose amplitude is 30 dB, say, below that of the high frequency tone. Such a calibration film produces a rectangular pattern on the CRT screen with horizontal and vertical dimensions corresponding to a standard tone amplitude and a standard distortion level, respectively. R1 is adjusted to match the horizontal dimension to scale 76, and R3 is then adjusted to match the vertical dimension to scale 74.

With that two-fold calibration, the CRT display gives immediate and quantitative information about both the degree of distortion and the quality of the reproduction of the high frequency tone itself. The base of the triangular display not only serves as an origin for indicating the phase of the distortion, but indicates by its length whether the high frequency tone has itself been properly reproduced. The present testing system alerts the printer operator of any such defect, which can sometimes be remedied, for example by adjustment of the pressure shoes. At the same time, the height and orientation of the display gives positive information by which the operator can adjust the printer and correct the print density to obtain minimum distortion from any given negative.

I claim:

1. The method of printing a negative photographic sound record of audio program material for a motion picture to produce a positive photographic sound record substantially free from cross-modulation and intermodulation distortion, comprising photographically recording on the same negative film and in serial relation to the program material a test signal responsive to said distortion, processing the negative film, printing at least the test signal portion of the negative film, measuring the magnitude and phase of the distortion in the resulting positive record of the test signal, and utilizing the measured distortion as a guide to correct exposure in printing the program material portion of the negative film.

2. The method according to claim 1, and in which said test signal comprises at least one audio tone of a first, relatively high, audio frequency, the amplitude of the tone varying at a second, relatively low, audio frequency, and said step of measuring the distortion comprises scanning the recorded test signal with a light beam to produce an electrical signal that corresponds to the photographic record of the test signal, deriving from the electrical signal high and low frequency components that correspond to said first frequency and said second frequency, respectively, and producing a display on a cathode ray tube while deflecting the cathode ray beam in one direction under control of the high frequency component and in the orthogonal direction under control of the low frequency component.

3. The method of visually indicating the magnitude and phase of cross-modulation and intermodulation distortion in a photographic sound record, comprising photographically recording on the same film and in serial relation to the sound record a test signal comprising at least one audio tone of a first, relatively high, audio frequency, the amplitude of the tone varying at a second, relatively low, audio frequency, scanning the recorded test signal with a light beam to produce an electrical signal that corresponds to the photographic record of the test signal, deriving from the electrical signal a high frequency component that includes the signal frequency corresponding to said first frequency and excludes the signal frequency corresponding to said second frequency, and a low frequency component that includes the signal frequency corresponding to said second frequency and excludes the signal frequency corresponding to said first frequency, and producing a display on a cathode ray tube while deflecting the cathode ray beam in one direction under control of the high frequency component and in the orthogonal direction under control of the low frequency component.

4. The method according to claim 3, and in which said test signal comprises a tone having a frequency of about 5,000 to 9,000 hertz, amplitude modulated at a frequency of about 400 hertz.

5. The method according to claim 3, and in which said test signal comprises two tones having relatively high audio frequencies that are separated by about 400 hertz, whereby each tone is effectively amplitude modulated at the difference frequency.

6. The method according to claim 3, and in which the length of said test signal record is less than about 10 inches, and said step of scanning the recorded test signal is carried out by producing relative oscillatory movement of an optical scanning beam longitudinally of the test signal record.

7. The method according to claim 3, and in which said step of scanning the recorded test signal is carried out by producing relative oscillatory movement of an optical scanning beam longitudinally of the record, said method including blanking the cathode ray beam whenever the amplitude of said high frequency component of the electrical signal is less than a selected threshold value.

8. The method according to claim 3, and in which said sound record has a predetermined normal reproduction speed and said step of scanning the recorded test signal is carried out predominantly at a scanning speed in the range from about one-fourth to about one-thirtieth of said normal reproduction speed.

9. The method according to claim 8, and in which said step of scanning the recorded test signal is carried out by producing nonlinear relative oscillatory movement of an optical scanning beam longitudinally of the record.

* * * * *